United States Patent [19]

McGown et al.

[11] 4,248,088

[45] Feb. 3, 1981

[54] FLOAT FOR USE IN TANK GAUGING SYSTEMS

[75] Inventors: James B. McGown, Attleboro, Mass.; Ernest F. Root, Nashua, N.H.

[73] Assignee: The Foxboro Company, Foxboro, Mass.

[21] Appl. No.: 42,162

[22] Filed: May 24, 1979

[51] Int. Cl.³ .................... G01F 23/10; G01F 23/12
[52] U.S. Cl. ............................... 73/319; 73/290 V; 73/322.5; 116/228; 361/220
[58] Field of Search ............... 73/319, DIG. 5, 322.5, 73/305, 294, 290 V; 361/212, 215, 220; 174/6; 116/228, 229, 227; 222/67, 51

[56] References Cited

U.S. PATENT DOCUMENTS 4,158,964  6/1979  McCrea et al. ................... 73/290 V Primary Examiner—Gerald Goldberg
Assistant Examiner—Denis E. Corr
Attorney, Agent, or Firm—Anthony N. Fiore, Jr.; Ronald J. Paglierani; Andrew T. Karnakis

[57] ABSTRACT

A float is disclosed for use in tank gauging systems of the type having a vertically supported guide. The float includes a donut-shaped body member adapted to be positioned about the guide to ride freely with the liquid surface. A discharged tube is positioned concentrically with the body member by a number of support members. The discharge tube is positioned below the liquid surface and acts as a discharge electrode to maintain the path of least resistance for an electrostatic discharge of the float below the liquid surface.

11 Claims, 3 Drawing Figures

FLOAT FOR USE IN TANK GAUGING SYSTEMS

BACKGROUND OF THE INVENTION

1. Field of the Invention

This invention relates generally to tank gauging systems of the type incorporating a free-float. More particularly, this invention relates to an electrostatically safe float for use in such systems.

2. Description of the Prior Art

One technique prevalent today in the measurement of liquid level within a storage tank includes a guide to be vertically supported within the tank. A donut-shaped float is positioned about the guide and is supported by the liquid surface. As the float rides with the liquid level, its position is sensed by suitable means to indicate the level of the liquid within the tank.

This type of system is generally acceptable in most applications, but presents a potential electrostatic hazard when applied in tanks containing flammable liquids. In storage tanks which are partially open to the surrounding atmosphere, such as cone-roof tanks, the electrostatic hazard is greatly increased.

It is well known in the art that during the process of pumping a liquid into a storage tank, the liquid will become electrostatically charged. The rate of accumulation of this charge is related to the flow rate and conductivity of the liquid. If the rate of accumulation of charge is greater than the rate at which it is neutralized, a net charge will be present on the bulk of the liquid, and consequently on the float. For example, at flow rate in excess of one meter/second, liquids having conductivities less than 50 picosiemens may develop a net charge of 30–40 K volts during the filling operation.

This net charge will be totally neutralized within a predetermined time period, called the Relaxation Time. The Relaxation Time may range from seconds for crude oil, to many minutes for gasoline or jet fuel.

During this time period, if the float comes sufficiently close to or in contact with, the vertically supported guide an electrostatic spark of sufficient energy may be developed in the tank's vapor space to cause an ignition of the flammable vapors.

One prior art solution calls for the float to be continuously tied to electrical ground by a bonding wire. In this manner, the two elements (i.e., the float and the wire) are maintained at the same electrical potential. The drawback of this approach is the maintenance of a reliable bond while allowing the float to ride freely with the liquid surface.

Another prior art solution calls for the use of a radioactive source contained within the float. The source ionizes the vapor space between the float and the guide, causing it to become conductive. This provides a low impedance discharge path between the float and the guide, such that static electric charge generated during the filling operation is neutralized before a sufficient net accumulation of charge to cause a spark is generated. The obvious drawback with this approach is customer acceptance of the radioactive source.

SUMMARY OF THE INVENTION

In accordance with one aspect of the present invention there is provided a float for use in tank gauging systems having a guide vertically supportable in the tank. In the preferred embodiment, the float includes a body member having an aperture for receiving the guide. The body member acts as a pontoon and rides freely with the liquid surface.

A discharge assembly is bonded to the body member and includes a tubular member positioned about the guide below the liquid surface. The tubular member is chosen to have a radius in relation to the radius of the body member aperture such that the path of least resistance for an electrostatic spark discharge of the float is maintained below the liquid surface.

Therefore, it is an object of the present invention to provide an improved float for use in tank gauging systems. Other objects, aspects and advantages of the invention will be pointed out in, or apparent from the following detailed description of the preferred embodiment, considered together with the accompanying drawings.

DESCRIPTION OF THE PREFERRED EMBODIMENT

Referring now to the accompanying drawings, the present invention will now be discussed in detail.

Figure 1:
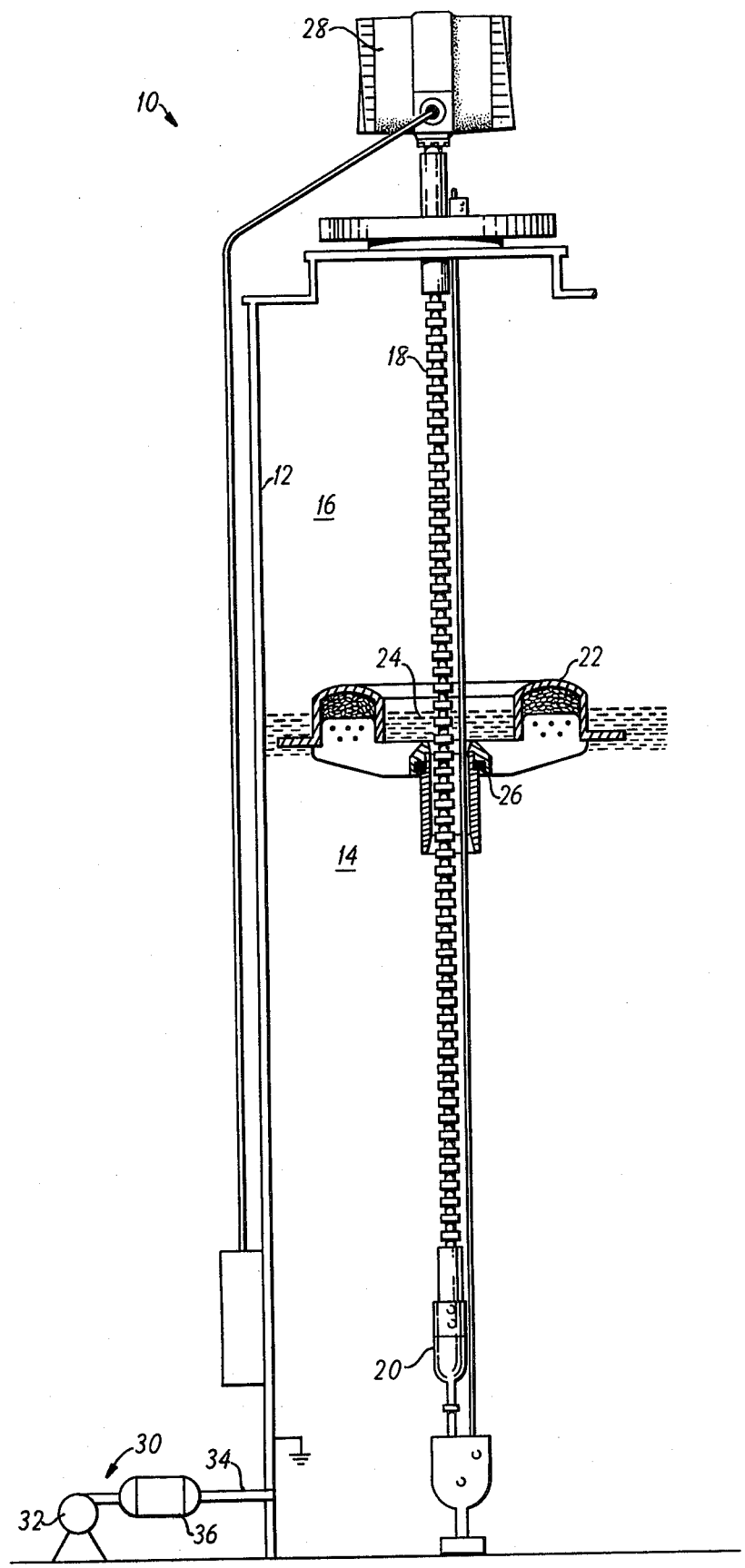
FIG. 1 illustrates a tank gauging system embodying the present invention.

FIG. 1 illustrates a tank gauging system 10 embodying the present invention. A storage tank 12 contains a liquid volume 14, such as gasoline, the level of which is to be measured and a vapor space 16. A guide 18 is tautly supported in a vertical position by a pulley assembly 20. The tank 12 and the guide 18 are both connected to electrical ground.

A float 22, having an aperture 24 and a magnet 26, is positioned about the guide 18 for unrestrained vertical movement with the liquid surface. As the float rides with the liquid surface, the position of the magnet 26 is sensed in a suitable manner by top works assembly 28 producing a direct measure of liquid level. An example of such a sensing system is disclosed in copending U.S. application Ser. No. 904,692, now U.S. Pat. No. 4,158,964, assigned to the assignee of this application.

An inlet assembly 30, including a pump 32, an inlet pipe 34 and a filter 36, is provided near the bottom of the tank 12 to facilitate the filling operation. Typically, the tank is filled by a variable-speed pumping operation which forces the liquid into the tank. As stated previously, a net electrostatic charge may be produced on the bulk of the liquid during the filling operation.

Before discussing the present invention in greater detail, a discussion of the generation and effects of the electrostatic charge will be presented.

It is well known that when two dissimilar materials, at least one of which is a good insulator, are brought into close contact and moved relative to one another, an electrostatic charge is generated. One of the materials will become positively charged, the other negatively charged. This effect is seen during the filling operation of a storage tank. As a liquid of high dielelctric strength (such as flammable liquids) is pumped into the tank at high flow-rates, the liquid will become electrostatically charged.

The major source of the generated electrostatic charge is flow-rate. It is the frictional contact of the liquid with the surface of any filters in the flow-line which is the major electrostatic generator. Other conditions, such as liquid contact with the inner walls of the flow-line, turbulence and the presence of entrained air, water and the like in the liquid enhanced the electrostatic generation.

Counteracting the effect of flow-rate is the neutralization of the charge within the tank as the tank is being filled. Generally, the charge tends to neutralize to the tank walls and the guide, both of which are, as stated previously, at electrical grounds.

The rate at which the charge will be neutralized, the Relaxation Time (T), is inversely related to the conductivity of the liquid. The relationship is defined as follows:

$$T = EE_o/k;$$

where, E is the dielectric constant of the liquid (about 2 for hydrocarbons), $E_o$ is the dielectric constant of a vacuum, and k is the conductivity of the liquid.

An electrostatic hazard may be defined as any circumstance which will produce a spark of sufficient energy to ignite the vapor space. A float by its presence provides an electrostatic hazard. It provides a place for an electrostatic spark discharge to occur. The large potential difference which exists between the float and the guide during the filling operation generates an electrostatic field in the area between the float and the guide. If the surface of the float is conductive, this electrostatic field will cause the float to be drawn to the guide. As the float comes sufficiently close to, or in contact with, the guide, a gap or path of least resistance and thus a resulting electrostatic spark discharge may be formed in the vapor space. The minimum resistance of the path required to produce a spark depends on the charge mobility in the vicinity of the float, the electrostatic potential and the dielectric constant of the vapor space.

In order for the generated spark to produce ignition two factors must be present. First, the vapor/air mixture of the vapor space must be in the explosive range, called the stoichiometric range; and second, the spark must contain sufficient energy.

The vapor/air mixture of the vapor space depends on various factors, such as the type of tank and the tank temperature. If the concentration of flammable vapors is too high, ignition cannot occur due to a lack of sufficient oxygen. If the concentration is too low there is not enough fuel for ignition. Between these extremes there is a range of concentrations, with one concentration being the easiest to ignite. This is approximately at the stoichiometric mixture of the vapor and air. Above the upper explosive limit the vapor concentration is such that ignition will not occur, no matter how much energy is available. At the opposite extreme is the lower explosive limit below which ignition will also not occur. As the vapor concentration deviates from the stoichiometric mixture, more energy is required for ignition until one of the limits is reached after which no amount of energy will cause ignition. Typically, for hydrocarbons, the stoichiometric range is 1.5 to 11% concentration of vapors by volume.

For hydrocarbons, the amount of energy required in a spark to cause an ignition is typically 0.25 millijoules. This amount of energy can be easily stored in a body having sufficient capacity. For example, assuming a static electric potential of 1,600 volts, which is relatively small for a static charge, the capacity required to store 0.25 millijoules of energy is only 200 picofarads.

Figure 2:
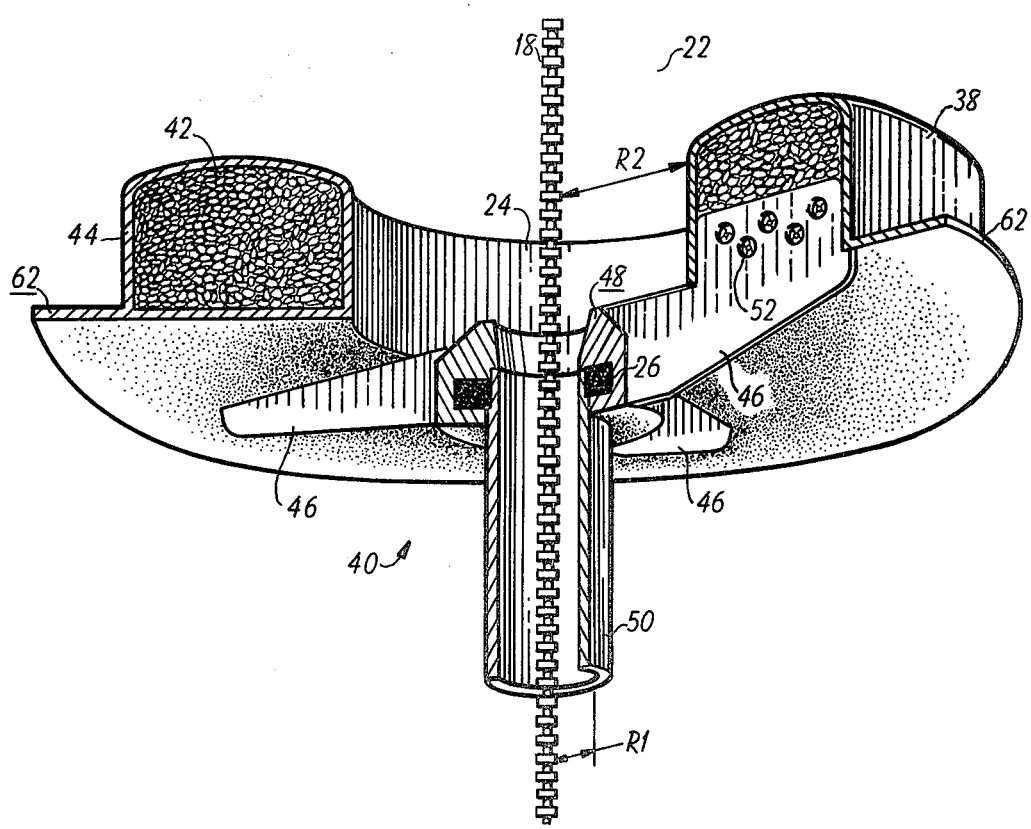
FIG. 2 illustrates, in a cut-away perspective view, the float of the present invention.

FIG. 2 illustrates a perspective view of the float 22 having a discharge means positioned below the surface of the liquid such that any spark which may be developed will occur below the liquid surface, rather than in the vapor space. That is, the float of the present invention has a geometry which assures that the discharge path for a spark is maintained below the liquid surface. In this manner, due to the lack of sufficient oxygen, ignition will not result.

The float 22 includes a body member 38, and a discharge assembly 40, as well as the magnet 26. Preferably, the float is fabricated of a non-conductive material to greatly reduce the charge mobility on the surface of the float and thus to greatly reduce the effects of the electrostatic field generated in the vicinity of the aperture 24.

The body member 38, having the aperture 24, acts as a pontoon to maintain the float stable as it rides on the liquid surface. The body member 38 includes a core 42 fabricated of a foamed urethane surrounded by a dense shell 44. The shell 44 is formed of a mixture of epoxy resin with miniature glass balloons.

The discharge assembly is connected to the body member 38 to be positioned below the liquid surface, and includes support members 46, an annular support ring 48 and a tubular member 50. The support members 46 are bonded to the body member 38 by suitable means, such as the bonding holes 52, and are provided to maintain the annular support ring 48 in fixed position.

The support ring 48 is provided to protect the magnet 26 and to maintain the tubular member 50 is fixed concentric position with the body member 38. Preferably, the support members are formed of nylon, and the support ring is formed of the same material as the shell 44.

The tubular means 50 is positioned below the liquid surface and acts as the main discharge means for the float during normal operation. The radius (R1) of the tubular member 50 is chosen in relation to the radius (R2) of the aperture 24 such that the path of least resistance for an electrostatic spark discharge is maintained below the liquid surface for all orientations of the float in the plane of FIG. 1.

Figure 3:
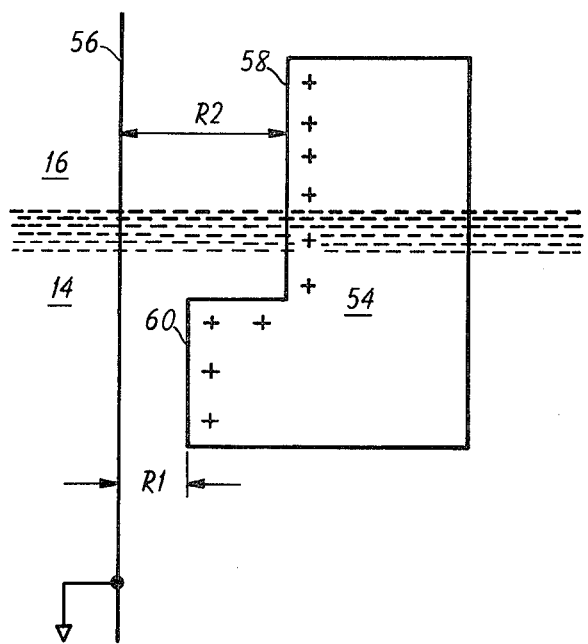
FIG. 3 illustrates the relationship between the two radii, R1 and R2, associated with the float structure of the present invention.

FIG. 3 illustrates the relationship between the radii R1 and R2. An electrostatically charged member 54, having a geometric characteristic similar to a half-section of the float 22, is shown positioned relative to an electrically grounded wire 56. The member 54 has a surface 58 a distance R2 from the wire, and a surface 60 a distance R1 from the wire. In this manner, two possible discharge paths are developed, path R1 and path R2.

As is well known in the art, an electrostatic charge will discharge along the path of least resistance, or in the present example, along path R1 or R2 depending upon their relative resistances.

The resistance of paths R1 and R2 depend upon the resistivity of the liquid 14 and the vapor 16, respectively. For example, the resistivity of a typical hydrocarbon is 150 Kvolts/ inch and the resistivity of the vapor space 16 will be in the order of 30 Kvolts/inch. Thus, the vapor to liquid resistivity factor (k) is 5. Therefore, if the radius R2 is 5 times larger than the radius R1 the resistance of the discharge paths below and above the liquid surface will be equal. Obviously, this is not acceptable for it produces an equal probability that a spark will occur above the surface of the liquid rather than below the liquid surface.

To maintain the path of least resistance below the liquid surface, it has been found that a safety factor (SF) of 3 or 4 is acceptable. Thus, for a radius R2 of 3 inches, and a safety factor of 3, then the radius R1 is:

$$Rl = \frac{R2}{(SF)(k)} = .20 \text{ inches}$$

The length of the member 50 is chosen to assure that as the float rotates in the plane of FIG. 1, the path of least resistance remains below the liquid surface. That is, again referring to FIG. 3, as the member 54 rotates in the plane of the FIG., the path (R1) defined by the surface 60 continuously presents the path of least resistance to the charge on the member 54. Preferably, the tubular member 50 has a length of 6 inches for the example cited above.

The inner surface of the member 50 is bevelled at both ends to assure unrestrained movement of the float, and preferably is made of nylon.

Also, a secondary discharge means is provided in the event the float 22 becomes free of the guide 18. The body member 38 is provided with a circumferential lip 62 below the liquid surface. The length of the lip 62 is chosen such that if the float becomes free of the guide, the lip 62 will provide the path of least resistance below the surface of the liquid if the float comes in contact with, or sufficiently close to, the walls of the tank 10.

While only a single embodiment of the invention has been illustrated and described in detail, the invention is not to be considered limited to the precise construction shown. Various adaptations, modifications and uses of the invention may occur to those skilled in the art to which the invention pertains and the intention is to cover all such adaptations, modifications and uses which fall within the spirit and scope of the appended claims.

We claim:

1. A float for use in determining the level of a liquid within a tank that includes a vertical guide positioned therein, said float comprising:
   (a) a body member having a first aperture allowing said member to be positioned about said guide so as to be supportable by the liquid surface;
   (b) discharge member means connected to said body member and extending downwardly therefrom to a level below the liquid surface, said discharge member means further including a second aperture at said level allowing it to be positioned about said guide;
   (c) the dimensions of said apertures having a predetermined relationship that always maintains a path from said discharge member means through said liquid to said guide as the path of least resistance for an electrostatic spark discharge of said float.

2. A float as in claim 1 wherein said body member and said discharge member means are formed of a non-conductive material.

3. A float as in claim 1 wherein said apertures constitute concentric circular openings whose radii are in fixed relationship.

4. A float as in claim 3 wherein the radius of the body member opening is more than five times larger than the radius of the discharge member means opening.

5. A float for use in measurement systems for determining the level of a flammable liquid within a storage tank wherein said systems including a guide adapted to be vertically supported within said tank and connected to electrical ground, said float comprising:
   (a) a body member for riding the liquid surface and having an aperture of a first predetermined radius for receiving said guide;
   (b) elongate tubular means coupled to said body member to be positioned about said guide below the liquid surface, said tubular means having a second predetermined radius; and,
   (c) wherein the radius of said tubular means is maintained in fixed relation to said aperture radius to maintain always the path of least resistance for an electrostatic spark discharge of said float below the liquid surface.

6. A float as in claim 5 wherein said tubular means is made of a non-conductive material.

7. A float as in claim 5 wherein said float further includes a circumferential lip positioned about said body member and below the liquid surface.

8. A float for use in systems for determining the level of a flammable liquid within a storage tank, said systems including a guide to be vertically supported within said tank and connected to electrical ground, said float comprising:
   (a) a circular body member freely supportable by the liquid surface and having an aperture of a first predetermined radius for receiving said guide;
   (b) a discharge assembly means including:
      (i) elongate tubular means having a second predetermined radius for receiving said guide; and,
      (ii) support means for positioning said tubular means below the liquid surface in fixed concentric relation with said body member; and,
   (c) wherein the radius of said tubular means has a predetermined relationship to the radius of said aperture such that the path of least resistance for an electrostatic spark discharge of said float is maintained below the liquid surface.

9. A float as in claim 8 wherein said body member is formed of a foamed urethane base and an epoxy shell.

10. A float as in claim 9 wherein said tubular means is made of nylon.

11. A float as in claim 9 wherein said body member includes a circumferential lip positioned below the liquid surface.

* * * * *